US012698595B2

(12) United States Patent　　(10) Patent No.: US 12,698,595 B2
Bayer　　(45) Date of Patent: Aug. 4, 2026

(54) HPMC COMPOSITION FOR COATING OF PAPER AND BOARD FOR REDUCING MIGRATION OF MINERAL OIL HYDROCARBONS (MOH)

(71) Applicant: NUTRITION & BIOSCIENCES USA 1, LLC, Wilmington, DE (US)

(72) Inventor: Roland Bayer, Bomlitz (DE)

(73) Assignee: NUTRITION & BIOSCIENCES USA 1, LLC, Wilmington, DE (US)

( * ) Notice: Subject to any disclaimer, the term of this patent is extended or adjusted under 35 U.S.C. 154(b) by 610 days.

(21) Appl. No.: 18/261,687

(22) PCT Filed: Jan. 26, 2021

(86) PCT No.: PCT/US2021/014992
　§ 371 (c)(1),
　(2) Date: Jul. 17, 2023

(87) PCT Pub. No.: WO2021/158387
　PCT Pub. Date: Aug. 12, 2021

(65) Prior Publication Data
　US 2024/0318384 A1　Sep. 26, 2024

(30) Foreign Application Priority Data
　Feb. 4, 2020　(EP) .................................... 20155281

(51) Int. Cl.
| *D21H 21/16* | (2006.01) |
| *D21H 11/14* | (2006.01) |
| *D21H 19/12* | (2006.01) |
| *D21H 23/22* | (2006.01) |
| *D21H 27/10* | (2006.01) |
| *C08K 5/053* | (2006.01) |

(52) U.S. Cl.
　CPC ............. *D21H 21/16* (2013.01); *D21H 11/14* (2013.01); *D21H 19/12* (2013.01); *D21H 23/22* (2013.01); *D21H 27/10* (2013.01); *C08K 5/053* (2013.01)

(58) Field of Classification Search
　None
　See application file for complete search history.

(56) References Cited

U.S. PATENT DOCUMENTS

| 9,051,115 | B2 | 6/2015 | Bushmann et al. | |
| 2002/0028857 | A1* | 3/2002 | Holy .......................... | C08L 3/00 |
| | | | | 523/124 |
| 2013/0101865 | A1* | 4/2013 | Ren ........................ | D21H 19/82 |
| | | | | 428/481 |
| 2014/0018531 | A1* | 1/2014 | Goerlach-Doht ....... | C08B 11/20 |
| | | | | 536/91 |
| 2014/0255629 | A1* | 9/2014 | Misiak ................... | D21H 21/16 |
| | | | | 524/45 |
| 2016/0222592 | A1* | 8/2016 | Müller ................... | D21H 23/44 |

FOREIGN PATENT DOCUMENTS

| WO | WO 2013/032673 A1 | 3/2013 |
| WO | WO 2014/018279 A1 | 1/2014 |

OTHER PUBLICATIONS

European Food Safety Authority (EFSA), "Scientific Opinion on Mineral Oil Hydrocarbons in Food. EFSA Panel on Contaminants in the Food Chain (CONTAM)," EFSA Journal 10(6):2704, 185pp. (Aug. 28, 2013)(replaces earlier version published Jun. 6, 2012).
International Search Report mailed May 14, 2021, in International Application PCT/US2021/014992.
Koivula et al., "Machine-Coated Starch-Based Dispersion Coatings Prevent Mineral Oil Migration from Paperboard," *Progress in Organic Coatings*, 99:173-181 (Jun. 13, 2016).
Kopacic, "Alginate and Chitosan as a Functional Barrier for Paper-Based Packaging Materials," *Coatings*, 8:235, 15pp. (2018).
Maes et al., "Recent Updates on the Barrier Properties of Ethylene Vinyl Alcohol Copolymer (EVOH): A Review," *Polymer Reviews*, 58(2):209-246 (published online Jan. 18, 2018).

* cited by examiner

*Primary Examiner* — Chinessa T. Golden
(74) *Attorney, Agent, or Firm* — Arnold & Porter Kaye Scholer LLP

(57) ABSTRACT

This disclosure relates to an aqueous solution for coating a paper or board surface for reducing MOSH or MOAH migration. The aqueous solution involves hydroxypropyl methylcellulose (HPMC) in an amount of from 10% to 60% (w/w), wherein the viscosity of said hydroxypropyl methylcellulose (HPMC) is from 2 mPa·s to 100 mPa·s, determined as a 2% (w/w) solution in water at 20° C. according to Ubbelohde.

19 Claims, No Drawings

HPMC COMPOSITION FOR COATING OF PAPER AND BOARD FOR REDUCING MIGRATION OF MINERAL OIL HYDROCARBONS (MOH)

CROSS-REFERENCE TO RELATED PATENT APPLICATIONS

This patent claims priority under 35 USC § 371 as a national phase of Int'l Patent Appl. PCT/US2021/014992 (filed Jan. 26, 2021; and published Aug. 12, 2021 as Int'l Publ. No. WO2021/158387), which, in turn, claims priority to European Patent Appl. 20155281.7 (filed Feb. 4, 2020). The entire text of each of the above-referenced patent applications is incorporated by reference into this patent.

FIELD

The present invention relates to the use of an aqueous solution of hydroxypropyl methylcellulose (HPMC) for coating of paper or board to reduce the migration or diffusion of Mineral Oil Hydrocarbons (MOH), more specifically Mineral Oil Saturated Hydrocarbons and Mineral Oil Aromatic Hydrocarbons (MOSH and MOAH) from the paper or board into for example food. The present invention further relates to paper or board packaging material, wherein the paper or board comprise a coating comprising hydroxypropyl methylcellulose.

INTRODUCTION

Paper and board is frequently used for packaging purposes, such as for packaging of foodstuff or medical products. The packaged material (contained products) may have direct contact to the paper or board or the products may be packaged in a plastic container, which may be positioned in paper or board container. Frequently this paper or board is produced from recycled paper or recycled board. It is generally known that recycled paper and board contain Mineral Oil Hydrocarbons (MOH), i.e. Mineral Oil Saturated Hydrocarbons (MOSH) and Mineral Oil Aromatic Hydrocarbons (MOAH) from printing inks, lacquers and other former uses and processes. The aliphatic and aromatic hydrocarbonic substances in the recycled paper or board may therefore contaminate the contained products, for example food, by migration upon direct contact of the paper or board with the foodstuff, or the mineral oil hydrocarbons may diffuse via the gas phase through plastic containers into the foodstuff. Furthermore, paper or board packaging materials are often printed on one side. In addition to pigments or dyes, the print colors may contain oily substances such as MOSH and MOAH, and the oily substances may migrate into or through the paper or board packaging material. In analogy with above, the oily substances from the prints may subsequently contaminate the contained products, for example foodstuff or medical products, via migration upon direct contact or via diffusion through gas phase.

Particularly MOAH substances are under suspicion for having carcinogenic, mutagenic or other undesired effects on the human body, and therefore contamination of packaged material with MOH is undesirable. Furthermore, the contaminants may influence the taste or odor of the packaged material in a negative manner. It is known in the art that a functional barrier between the packaging material and the contained products can reduce or prevent the contamination of the contained products with MOSH or MOAH from the packaging material and it is expected that EU regulation will be passed which will impose a requirement of a functional barrier between recycled paper/board and foodstuff. [European Food Safety Authority; Scientific Opinion on Mineral Oil in Food; EFSA Journal 2012; 10(6):2704].

EVOH (ethylene-vinylalcohol-copolymers) has been described as a functional barrier against MOSH and MOAH as well as barriers against BTEX (benzene, toluene, ethylbenzene, xylene isomers) [Maes, C. e. al., Polymer Reviews, 2018, 58 (2), 209-246]. However, EVOH is not made from renewable resources and the polymer is not biodegradable; and therefore use of EVOH potentially leads to pollution of the environment with nanoplastics.

U.S. Pat. No. 9,051,115 describe a cardboard or paper interspersed with a filter material, such as activated charcoal, that absorbs mineral oil substances (MOSH/MOAH). However, the interspersed cardboard or paper requires a complex, and therefore costly, manufacturing process with the preparation of several layers on top of each other.

Alginate and chitosan has been tested as a functional barrier for paper-based packaging materials or [Kopacic, S; Coatings (2018), 8, 235]. However, the disclosed solution for coating are highly dilute (4% solid content) which is unsuitable for coating of packaging material on an industrial scale due to the large amounts of water to be evaporated, requiring high and costly energy consumption. Furthermore, the coating thickness of the applied alginate and chitosan coatings would merely be 1.6 µm in the dry state (4% solid content in 40 µm wet film thickness).

US2014/0255629 disclose a dispersion for a barrier coating comprising at least 50% of a polyvinyl acetate copolymer in combination with a second polymer, for example a cellulose derivative. The barrier coating is intended for application on cardboard or paper to decrease the migration of oily substances such as MOSH or MOAH. Polyvinylacetate however is a fully synthetic polymer, i.e. it is not prepared from renewable resources Thus there is a need in the art to provide further functional barrier coatings for preventing migration of MOSH and MOAH substances from paper or board into packaged goods.

A preferred object of the present invention is to provide a composition for barrier coating for application on paper or board; wherein the applied barrier coating prevents or reduces the migration of MOSH and/or MOAH substances. Another object of the present invention is to provide a barrier coating composition for application on paper or board, the composition being easily applicable on paper and/or board in an industrial scale. Another object of the invention is to provide a water-based barrier coating composition which requires no use of organic solvents having a low boiling point, which require costly safety precautions (e.g. explosion protection equipment) and/or costly recycling measurements when used in an industrial scale in the paper industry. Another object of the invention is to provide a water-based barrier coating composition based on naturally occurring substances. Yet another object of the invention is to provide a barrier coating composition having a sufficiently high concentration (i.e. high solid content) to avoid costly and energy consuming evaporation of large amounts of water, and furthermore preventing the barrier coating from drying under tension, which could lead to crack formation or other surface defects in the coating or deformation of the paper/board after drying. At the same time, it is an object of the invention to provide a barrier coating composition wherein the viscosity of the barrier coating composition is sufficiently low to permit application of a smooth coating or film. Another object of the invention is to provide a barrier coating composition which upon drying forms a dense film (coating) without pinholes and which forms a flexible film (coating) which is not brittle.

SUMMARY

An aqueous hydroxypropyl methylcellulose (HPMC) solution has been developed which upon coating on paper or board surprisingly prevents or reduces MOH (MOSH and MOAH) migration from paper or board into a packaged material, such as foodstuff.

Accordingly, the present invention relates to an aqueous solution for coating a paper or board surface for reducing MOSH or MOAH migration, said aqueous solution comprising hydroxypropyl methylcellulose (HPMC) in an amount of from 10% to 60% (w/w), wherein the viscosity of said hydroxypropyl methylcellulose (HPMC) is from 2 mPa·s to 100 mPa·s, determined as a 2% (w/w) solution in water at 20° C. according to Ubbelohde. In another embodiment, the invention relates to a coating composition for coating a paper or board surface, said coating composition comprising the aqueous solution comprising hydroxypropyl methylcellulose (HPMC) in an amount of from 10% to 60% (w/w), wherein the viscosity of said hydroxypropyl methylcellulose (HPMC) is from 2 mPa·s to 100 mPa·s. In yet another embodiment the invention relates to the use of the coating composition according to the embodiment above for reducing MOSH or MOAH migration.

In yet another embodiment the invention relates to a paper or board surface comprising the coating composition according to the embodiment above.

In another embodiment, the invention relates to a method for applying the coating composition according to the embodiment above to a paper or board surface, the method comprising preparing the above mentioned coating composition followed by contacting a paper or board surface with said coating composition.

In another embodiment, the invention relates to a use of a paper or board comprising the coating composition according to the embodiment above for packaging material.

Definitions

In the present context, Mineral oil hydrocarbons (MOH) or mineral oil products are hydrocarbons containing 10 to about 50 carbon atoms. MOH consist of three major classes of compounds: paraffins (comprising linear and branched alkanes), naphthenes (comprising alkyl-substituted cyclo-alkanes), and aromatics (including polyaromatic hydrocarbons (PAHs), which are generally alkyl-substituted and only contain minor amounts of non-alkylated PAHs). MOH may also include minor amounts of nitrogen- and sulphurcontaining compounds. Within these classes there are enormous numbers of individual components. [Ref.: European Food Safety Authority; Scientific Opinion on Mineral Oil in Food; EFSA Journal 2012; 10(6):2704]

In the present context, MOH have been divided into two main types,

Mineral Oil Saturated Hydrocarbons (MOSH), comprising alkanes, both branched and unbranched (paraffins); and cycloalkanes, mainly cyclopentanes and cyclohexanes, alkylated and non-alkylated, mono-, di- and higher ring systems (naphthenes); and Mineral Oil Aromatic Hydrocarbons (MOAH), comprising aromatics (mono-, di- and higher ring systems), including alkyl-substituted aromatics

In the present context, the terms 'paper' and/or 'board' is intended to include materials such as paper, board, carton, cardboard, corrugated paper, corrugated cardboard. Paper and board materials and articles are manufactured from cellulose-based natural fibres both bleached and unbleached, from both primary and recycled sources. Paper and board materials may comprise one or more layers of fibres. In addition, paper and board materials may contain man-made fibres (regenerated and/or synthetic cellulose), functional additives and other treatment agents, polymeric binders for organic and inorganic pigments and plastic films. Paper and board articles may contain, in addition, inks, varnishes, coatings, adhesives and plastic films used during the conversion process.

The term 'Recycled paper and/or board' indicates paper and/or board prepared from recycled cellulosic fibers.

The term 'Primary cellulosic fibers' indicates fresh cellulosic fibers from for example from hardwood or soft wood.

The term 'Secondary cellulosic fibers' indicates cellulos fibers made from recycled fibers.

DETAILED DESCRIPTION

In an embodiment the invention relates to the aqueous solution for coating a paper or board surface for reducing MOSH or MOAH migration, said aqueous solution comprising hydroxypropyl methylcellulose (HPMC) in an amount of from 10% to 60% (w/w), wherein the viscosity of said hydroxypropyl methylcellulose (HPMC) is from 2 mPa·s to 100 mPa·s, determined as a 2% (w/w) solution in water at 20° C. according to Ubbelohde; and wherein the viscosity of said aqueous solution is from 200 to 80,000 mPa·s determined at 20° C. according to Haake.

In an embodiment the invention relates to the aqueous solution according to any one of the above embodiments, comprising water in an amount of from 30-90% (w/w).

In an embodiment the invention relates to paper or board surface comprising a layer of a coating composition comprising the aqueous solution according to any one of the above embodiments, wherein the wet-film thickness of said layer is less than 200 ☐m.

In an embodiment the invention relates to a recycled paper or board surface or printed paper or board surface, comprising a coating composition according to the embodiments above.

The Hydroxypropyl methylcellulose (HPMC) has a cellulose backbone having β-1,4 glycosidically bound D-glucopyranose repeating units, designated as anhydroglucose units in the context of this invention. At least a part of the hydroxyl groups of the anhydroglucose units are substituted by a combination of methoxyl and hydroxypropoxyl groups.

The average number of methoxyl groups per anhydroglucose unit is designated as the degree of substitution of methoxyl groups, DS. In the definition of DS, the term "hydroxyl groups substituted by methoxyl groups" is to be construed within the present invention to include not only methylated hydroxyl groups directly bound to the carbon atoms of the cellulose backbone, but also methylated hydroxyl groups of hydroxypropoxyl substituents bound to the cellulose backbone.

The degree of the substitution of hydroxyl groups of the anhydroglucose units by hydroxypropoxyl groups is expressed by the molar substitution of hydroxypropoxyl groups, the MS. The MS is the average number of moles of hydroxypropoxyl groups per anhydroglucose unit in the hydroxypropyl methylcellulose. It is to be understood that during the hydroxypropoxylation reaction the hydroxyl group of a hydroxypropoxyl group bound to the cellulose backbone can be further etherified by a methylation agent and/or a hydroxypropoxylation agent. Multiple subsequent hydroxypropoxylation reactions with respect to the same carbon atom position of an anhydroglucose unit yields a side chain, wherein multiple hydroxypropoxyl groups are covalently bound to each other by ether bonds, each side chain as a whole forming a hydroxypropoxyl substituent to the cellulose backbone. The term "hydroxypropoxyl groups" thus has to be interpreted in the context of the MS as referring to the hydroxypropoxyl groups as the constituting units of hydroxypropoxyl substituents, which either comprise a single hydroxypropoxyl group or a side chain as outlined above, wherein two or more hydroxypropoxyl units are covalently bound to each other by ether bonding. Within this definition it is not important whether the terminal hydroxyl group of a hydroxypropoxyl substituent is further methylated or not; both methylated and non-methylated hydroxypropoxyl substituents are included for the determination of MS.

The amount of methoxyl groups and hydroxypropoxyl groups may also be determined as a weight percent of the methoxyl groups or a weight percent of the hydroxy-propoxyl groups of the total weight of the hydroxypropyl methylcellulose, i.e. including its substituents. The hydroxy-propyl methylcellulose of the present invention may for example have from 16 to 20 weight percent of methoxyl groups and from 23 to 32 weight percent of hydroxy-propoxyl groups; from 19 to 24 weight percent of methoxyl groups and from 4 to 12 weight percent of hydroxypropoxyl groups; from 19 to 24 weight percent of methoxyl groups and from 7 to 12 weight percent of hydroxypropoxyl groups; from 27 to 30 weight percent of methoxyl groups and from 4 to 8 weight percent of hydroxypropoxyl groups or from 28 to 30 weight percent of methoxyl groups and from 7 to 12 weight percent of hydroxypropoxyl groups; based on the total weight of hydroxypropyl methylcellulose, The content of hydroxypropoxyl groups and methoxyl groups is determined as described for 'Hypromellose', United States Pharmacopeia and National Formulary, USP 35.

The hydroxypropyl methylcellulose (HPMC) comprised in the aqueous solution of the present invention preferably has a viscosity 2 to 100 mPa·s, preferably from 2 to 100 mPa·s, more preferably from 2 to 60 mPa·s, in particular from 2 to 50 mPa·s, such as from 2 to 40 mPa·s, from 2 to 30 mPa·s, from 2 to 20 mPa·s, such as from 2.4 to 6 mPa·s, from 2.4 to 5 mPa·s, from 2 to 4 mPa·s, from 2.4 to 4 mPa·s, from 3 to 6 mPa·s, from 3 to 5 mPa·s or from 3 to 4 mPa·s, measured as a 2 weight-% aqueous solution at 20° C. according to Ubbelohde. Ubbelohde viscosity measurements are conducted according to DIN 51562-1:1999-01 (January 1999). For example, a 2.0% by weight solution of hydroxypropyl methylcellulose in water is prepared according to United States Pharmacopeia (USP 35, "Hypromellose", followed by an Ubbelohde viscosity measurement according to DIN 51562-1:1999-01 (January 1999).

The aqueous solution for the coating of paper or board, according to any one of the embodiments above, preferably has a viscosity of more than 200 mPa·s, preferably from 500 to 20,000 mPa·s, more preferably from 500 to 18,000 mPa·s, such as from 500 to 17,000 mPa·s; from 1,000 to 17,000 mPa·s; from 2,000 to 16,000 mPa·s; from 4,000 to 12,000 mPa·s; from 5,000 to 10,000 mPa·s determined at 20° C. in a Haake RS600 rheometer with a cone and plate Geometry (CP-60/2°) at 20° C. and at a shear rate of 2.55 s$^{-1}$.

The aqueous solution for coating a paper or board surface for reducing MOSH or MOAH migration, according to any one of the embodiments above, may comprise hydroxypro-pyl methylcellulose (HPMC) in an amount of from 10% to 60% (w/w) of the aqueous solution, such as in an amount of from 10% to 50% (w/w), such as from 20% to 50% (w/w), such as from 25% to 50% (w/w), such as from 30% to 50% (w/w), such as from 25% to 40% (w/w) of the aqueous solution.

The aqueous solution for coating a paper or board surface for reducing MOSH or MOAH migration according to any one of the embodiments above, may comprise water in an amount of from 30-90% (w/w) of the solution, such as from 40-80% (w/w), such as from 50-80% (w/w), such as from 40-75% (w/w), such as from 50-75% (w/w), such as from 60-75% (w/w) of the solution.

In an embodiment the invention relates to the aqueous solution according to the embodiments above, comprising a plasticizer.

In a further embodiment the invention relates to the aqueous solution according to the embodiments above, comprising a plasticizer in an amount of up to 20% (w/w).

In an embodiment the invention relates to the aqueous solution according to the embodiments above, wherein the plasticizer is selected from the group consisting of ethylene glycol and propylene glycol.

In an embodiment the invention relates to the aqueous solution for coating a paper or board surface for reducing MOSH or MOAH migration, according to any one of the embodiments above, comprising a plasticizer in an amount of from 0 to 20 (w/w) % of the solution, such as from 0 to 15 (w/w) %, such as from 1 to 15 (w/w) %, such as from 1 to 20 (w/w) %, such as from 2 to 15 (w/w) %, such as from 2 to 12 (w/w) %, such as from 3 to 12 (w/w) %, such as from 5 to 10 (w/w) % of the solution.

In an embodiment the invention relates to paper or board surface comprising a layer of a coating composition comprising the aqueous solution according to any one of the embodiments above, wherein the wet-film thickness of said layer is less than 200 □m, such as 10-150 □m, such as 10-140 □m, such as 15-120 □m, such as 20-100 □m, such as 20-70 □m or such as 20-50 □m.

EXPERIMENTAL

The hydroxypropyl methylcellulose (HPMC) used in the examples below is Methocel™ available from DuPont:
HPMC 'K3' denotes Methocel K3 LV, nominal Viscosity 3 mPa·s, measured as 2% in water at 20° C., according to Ubbelohde; methoxyl substitution 19.0-24.0%; hydroxypropoxyl substitution 7.0-12.0%. HPMC 'E3' denotes Methocel E3 LV, nominal Viscosity 3 mPa·s, measured as 2% in water at 20° C., according to Ubbelohde; methoxyl substitution 28.0-30.0%; hydroxypropoxylsubstitution 7.0-12.0%. HPMC 'E1.5' denotes Methocel E1.5 LV, nominal Viscosity 1.5 mPa·s, according to Ubbelohde, measured as 2% in water at 20° C.; methoxyl substitution 28.0-30.0%; hydroxypropoxylsubstitution 7.0-12.0%. HPMC 'E1.8' denotes Methocel E1.8 LV, nominal Viscosity 1.8 mPa·s, measured as 2% in water at 20° C. according to Ubbelohde; methoxyl substitution 28.0-30.0%; hydroxypropoxylsubstitution 7.0-12.0%.

The platicizers Ethylene glycol (EG) and Propylene gly-col (PG) are commercially available.

Ubbelohde viscosity measurements are conducted according to DIN 51562-1:1999-01 (January 1999). For example, a 2.0% by weight solution of hydroxypropyl methylcellulose in water is prepared according to United States Pharmacopeia (USP 35, "Hypromellose", followed by an Ubbelohde viscosity measurement according to DIN 51562-1:1999-01 (January 1999).

Haake viscosity measurements are conducted at 20° C. in a Haake RS600 rheometer with a cone and plate Geometry (CP-60/2°) at 20° C. and at a shear rate of 2.55 s$^{-1}$ In this context the wet-film thickness of the applied coating or film is defined as slit-width of the doctor blade which was used for application of the film onto paper or board.

Examples

General Method 1: Procedure for Preparing an Aqueous Solution Comprising Hydroxypropyl Methylcellulose and Optionally Plasticizer:

To avoid lump formation X g hydroxypropyl methylcellulose was carefully and slowly filled into Y mL of stirred water in a beaker glass with screw cap (stirrer IKA RE166 with dissolver disk). After short time the powder was dissolved. The glass was closed with the screw cap and was put onto a roll for three hours. An overnight repose of the glass was used to regress the foam formation and potential air bubbles.

In a second step Z g of the plasticizer was filled into another beaker glass with screw cap. W g of the hydroxypropyl methylcellulose solution from the first step was added and the beaker glass was closed and was put onto a roll for three hours.

Preparation of the Aqueous Solution of Example 2 According to General Method 1: Aqueous Solution Containing 27% (w/w) Methocel E3 and 10% (w/w) of Propylene Glycol:

150 g Methocel E3 was carefully and slowly filled into 350 ml of stirred water in a 1000 mL beaker glass. An aqueous HPMC solution was prepared as described in general method 1 above.

5 g propylene glycol was filled into a beaker glass. 45 g of the HPMC solution from step 1 was added, the beaker glass was closed and kept on a roll for three hours. Total concentration of HPMC and propylene glycol: 37% (w/w). Ratio of HPMC (E3):plasticizer (PG) (w:w) 73:27.

Aqueous solutions Examples 1-8, and Examples A-B were prepared according to general procedure 1.

Examples 1-8 are examples of the present invention.

Comparative Examples A and B are prepared for the purpose of the present invention.

Comparative Examples A and B are not part of state of the art.

Determination of Film Properties: Qualitative Optical and Qualitative Brittleness Determination The solutions of Examples 1-8 and A-B were applied with a doctor blade having a slit width of 120 μm onto a glass plate and dried at 25° C. After drying, the film was optically inspected for cracks and surface defects both by direct visual inspection and by inspection under a microscope.

Furthermore, a qualitative test for brittleness was performed.

Compositions for which no cracks or surface defects were detected in the films, and for which the films were not brittle, were submitted to further testing in the Pinhole test.

Results are disclosed in Table 1 below.

Pinhole Test

The pinhole test was performed on films which were prepared by addition of the aqueous HPMC solutions of Examples 1-8 onto a paper surface to investigate whether the film applied on paper was free of holes and impermeable for liquids. Compositions were applied with a doctor blade having a slit size of 15 μm, corresponding to a wet film thickness of 15 μm, onto a testing paper (smart H, size A6) and the compositions were allowed to dry for 1 h at 40° C. A methylene blue solution (0.3 g methylene blue dissolved in 100 ml ethanol) was applied dropwise onto the dried film and was immediately wiped away with a fabric. If the backside of the paper showed no blue spots or marks, the material passed the test, that is, it was determined to be without holes and to be impermeable for liquids. If the material did not pass the test, the coating was repeated with a higher wet-film thickness: 30, 60, 90 and up to 120 μm.

Results are disclosed in Table 1 below.

General Procedure of MOSH-MOAH Migration-Testing

A paper or cardboard made from fresh (primary) fibres was impregnated with seven different chemicals from the six different chemical classes which typically are found in recycled paper and cardboard, i.e. aliphatics, aromatics, condensed aromatics, alkyl aromatics, photoinitiators and phthalates by dipping the paper into a hexane solution of the chemical substances. The chemical substances used for impregnation were: n-hexadecane (50 mg/500 mL hexane), n-eicosane (50 mg/500 mL hexane), biphenyl (50 mg/500 mL hexane), naphthalene (50 mg/500 mL hexane), 1-phenyldodecane (50 mg/500 mL hexane), 4-methylbenzophenon (100 mg/500 mL hexane) and dicyclohexylphthalate (150 mg/500 mL hexane). The impregnated paper or cardboard simulated a recycled paper or cardboard but with constant and reproducible amounts of impurities. The impregnated paper or cardboard acted as the donor of chemical impurities. The HPMC composition of Examples 1-8 were applied (coated) on another paper or cardboard made from fresh (primary) fibres, using a doctor blade having a slit-width of 15 □m. In a testing cell the coated paper was positioned between the impregnated donor paper or cardboard and a food simulant (Supelpak 2, a purified amberlite ion exchange resin of a crosslinked copolymer of styrene and divinylbenzene), the coated side of the paper facing the food simulant. The food simulant acted as acceptor of the MOSH/MOAH substances. The testing cell mounted with impregnated paper, coated paper and food simulant was kept at 40° C. for 5 days. Afterwards, the food simulant was extracted with hexane and the hexane solution was analysed with GC-FID (Gas Chromatography—Flame Ionisation Detector) to determine the amount of chemicals absorbed in the acceptor. In addition to the analysis of the testing samples (Examples 1-8), testing was performed with a "blind" sample and a "control sample". The blind sample was performed with a non-coated paper and an impregnated donor paper/cardboard and indicated the theoretical maximum migration of chemicals from the donor material into the acceptor material (Supelpak 2 as simulated food). The test result of the Examples 1-8 (migration of each specific chemical substance through the tested coating) was calculated as the amount of the chemical substance absorbed in the food simulant from the test sample divided by the amount of the chemical substance absorbed in the food simulant from the blind test, both measured with GC-FID. The control sample was measured from a clean paper/cardboard without impregnation and a non-coated paper. The control sample served to reveal potential impurities coming from impure test conditions.

Results are disclosed in Table 1 below.

TABLE 1

| | Example | | | | | | | | | |
|---|---|---|---|---|---|---|---|---|---|---|
| | 1 | 2 | 3 | 4 | 5 | 6 | 7 | 8 | A | B |
| Ratio HPMC: plasticizer (w:w) | 85.7 E3: 14.3 PG | 73 E3: 27 PG | 82.6 K3: 17.4 PG | 73 K3: 27 PG | 85.7 E3: 14.3 EG | 73 E3: 27 EG | 100 E3 | 100 K3 | 100 E1.5 | 100 E1.8 |
| % (w/w) HPMC in the solution plasticizer | 30 | 27 | 24 | 26 | 30 | 27 | 30 | 25 | 30 | 30 |
| % (w/w) plasticizer in the solution | 5 | 10 | 5 | 9 | 5 | 10 | 0 | 0 | 0 | 0 |
| Total concentration % (w/w) (HPMC and plasticizer) | 35 | 37 | 29 | 35 | 35 | 37 | 30 | 25 | 30 | 30 |
| Viscosity of final solution (mPas)[1] | 16600 | | 7300 | 8700 | 17900 | | 7300 | 11200 | | |
| Film properties, inspection of optical properties passed | yes | yes | yes | yes | yes | yes | yes | yes | yes | yes |
| Film propertie s, inspection of brittleness passed | yes | yes | yes | yes | yes | yes | yes | yes | no | no |
| wet-film thickness (μm), pinhole test passed | 15, yes | 15, yes | 30, yes | 30, yes | 15, yes | 10, yes | 15, yes | 15, yes | — | — |
| Migration of n-hexadecane (in %) | 4.45 | 2.8 | 8.5 | 11.6 | 2.8 | 3.9 | 11.7 | 4.1 | — | — |
| Migration of n-eicosane (in %)[3] | 0.98 | 0.66 | 1.7 | 1.7 | 0.66 | 0 | 2.7 | 0.8 | — | — |
| Migration of biphenyl (in %) of | 2.8 | 1.6 | 3.9 | 6.8 | 1.6 | 2.9 | 6.6 | 1.4 | — | — |
| Migration naphtalene (in %) | 2.9 | 0.9 | 8.9 | 12.7 | 0.9 | 3.7 | 9.1 | 1.8 | — | — |
| Migration of 1-phenyldodecane (in %) | 1.40 | 1.0 | 2.6 | 3.4 | 1.0 | 0.78 | 1.8 | 1.0 | — | — |
| Migration of 4-methylbenzophenon (in %) | 0.0 | 0.52 | 0 | 2.7 | 0.52 | 0 | 0 | 0 | — | — |
| Migration of dicyclohexyl-phthalate (in %) | 0.0 | 0 | 0 | 0 | 0 | 0 | 0 | 0 | — | — |

[1]Haake viscosity

The invention claimed is:

1. A paper or board comprising a coating comprising an aqueous solution for reducing mineral oil saturated hydrocarbon (MOSH) or mineral oil aromatic hydrocarbon (MOAH) migration on a surface of the paper or board, the aqueous solution consisting of: (a) water and hydroxypropyl methylcellulose (HPMC) in an amount of from 10% to 60% (HPMC weight/total weight), wherein a viscosity of the hydroxypropyl methylcellulose (HPMC) is from 2 mPa·s to 100 mPa·s, determined as a 2% (w/w) solution in water at 20° C. according to Ubbelohde; or (b) water and HPMC in an amount of from 10% to 60% (HPMC weight/total weight), wherein a viscosity of the HPMC is from 2 mPa·s to 100 mPa·s, determined as a 2% (w/w) solution in water at 20° C. according to Ubbelohde, and a plasticizer.

2. The paper or board according to claim 1, wherein a viscosity of the aqueous solution of either (a) or (b) is from 200 to 80,000 mPa·s determined at 20° C. according to Haake.

3. The paper or board according to claim 1, wherein the plasticizer in (b) is present in an amount of up to 20% (plasticizer weight/total weight).

4. The paper or board according to claim 1, wherein the plasticizer is selected from the group consisting of ethylene glycol and propylene glycol.

5. The paper or board according to claim 1, wherein the water in (a) or (b) is present in an amount of from 40% to 90% (water weight/total weight).

6. The paper or board according to claim 1, wherein the plasticizer of (b) is present in an amount from 5% to 10% (plasticizer weight/total weight).

7. The paper or board according to claim 1, wherein the coating has a wet-film thickness of 10 μm-150 μm.

8. A method for reducing mineral oil saturated hydrocarbon (MOSH) or mineral oil aromatic hydrocarbon (MOAH) migration on a paper or board surface, wherein the method comprises:

(a) contacting the paper or board surface with:

(i) an aqueous solution consisting of water and a hydroxypropyl methylcellulose (HPMC) in an amount of from 10% to 60% (HPMC weight/total weight), wherein a viscosity of the HPMC is from 2 mPa·s to 100 mPa·s, determined as a 2% (w/w) solution in water at 20° C. according to Ubbelohde; or (ii) an aqueous solution consisting of water, HPMC in an amount of from 10% to 60% (HPMC weight/total weight), wherein a viscosity of the HPMC is from 2 mPa·s to 100 mPa·s, determined as a 2% (w/w) solution in water at 20° C. according to Ubbelohde, and a plasticizer; and (b) allowing the aqueous solution of (a) (i) or (a) (ii) to dry on the paper or board surface to create a coating on the paper or board surface that reduces the MOSH or MOAH migration as compared to a paper or board lacking the coating.

9. A paper or board surface comprising the coating produced in claim 8.

10. The paper or board surface according to claim 9, wherein the paper or board is recycled paper or board or printed paper or board.

11. The paper or board surface according to claim 9, wherein the paper or board surface comprises a layer of the coating, and wherein a wet-film thickness of the layer is less than 200 μm.

12. A packaging material comprising a paper or board surface according to claim 9.

13. The method according to claim 8, wherein the plasticizer is selected from the group consisting of ethylene glycol and propylene glycol.

14. The method according to claim 8, wherein the plasticizer is present in an amount from 5% to 10% (plasticizer weight/total weight).

15. The method according to claim 8, wherein the coating has a wet-film thickness of 10 μm-150 μm.

16. A method for applying a coating composition to a paper or board surface, the method comprising (a) preparing the coating composition, wherein the coating composition consists of:

(i) an aqueous solution consisting of water and a hydroxypropyl methylcellulose (HPMC) in an amount of from 10% to 60% (HPMC weight/total weight), wherein a viscosity of the HPMC is from 2 mPa·s to 100 mPa·s, determined as a 2% (w/w) solution in water at 20° C. according to Ubbelohde; or (ii) an aqueous solution consisting of water, HPMC in an amount of from 10% to 60% (HPMC weight/total weight), wherein a viscosity of the HPMC is from 2 mPa·s to 100 mPa·s, determined as a 2% (w/w) solution in water at 20° C. according to Ubbelohde, and a plasticizer, and (b) contacting the paper or board surface with the coating composition.

17. The method according to claim 16, wherein the plasticizer is selected from the group consisting of ethylene glycol and propylene glycol.

18. The method according to claim 16, wherein the plasticizer is present in an amount from 5% to 10% (plasticizer weight/total weight).

19. The method according to claim 16, wherein the coating composition has a wet-film thickness of 10 μm-150 μm on the paper or board surface in (b).

* * * * *